United States Patent [19]

Beyerlein et al.

[11] 3,986,806

[45] Oct. 19, 1976

[54] INJECTION MOULDING APPARATUS

[75] Inventors: Ludwig Beyerlein, Lenzfried; Otto Lachner, Kempten; Manfred Langer, Boerwang-Nord, all of Germany

[73] Assignee: Lever Brothers Company, New York, N.Y.

[22] Filed: July 29, 1974

[21] Appl. No.: 492,560

[30] Foreign Application Priority Data
Aug. 1, 1973  Germany............................ 2339020
Aug. 1, 1973  Germany............................ 2339018

[52] U.S. Cl.................... 425/247; 425/129 R; 425/157; 425/167; 425/324 B; 425/249; 249/63; 249/68
[51] Int. Cl.².................... B29D 23/02; B29F 1/022
[58] Field of Search ............ 425/117, 129, 246, 247, 425/249, 242 R, 129 R; 249/68

[56] References Cited
UNITED STATES PATENTS

| | | | |
|---|---|---|---|
| 2,974,362 | 3/1961 | Knowles.......................... | 425/246 X |
| 3,004,291 | 10/1961 | Schod ............................. | 249/68 X |
| 3,121,919 | 2/1964 | Turner............................. | 425/246 |
| 3,159,701 | 12/1964 | Herter............................. | 425/129 X |
| 3,196,483 | 7/1965 | Eyles.............................. | 249/68 X |
| 3,608,133 | 9/1971 | Cyriax et al. .................... | 249/68 X |
| 3,647,337 | 3/1972 | Dega.............................. | 425/242 |

*Primary Examiner*—J. Howard Flint, Jr.

[57] ABSTRACT

An injection moulding apparatus having an injection mould and a mandrel insertable within the mould is provided with frustoconical co-operating surfaces on the mandrel and mould respectively which are adapted to engage with one another when the mandrel is inserted in the mould. A sliding connection is provided between the mould and its carrier so that the engagement of the conical surfaces can effect alignment of the axis of the mould with the axis of the mandrel. A locking device is provided for locking the mould to the carrier together with a locking control mechanism which releases the locking device as the conical surfaces approach one another and locks the mould to the carrier when the conical surfaces are fully engaged.

4 Claims, 6 Drawing Figures

INJECTION MOULDING APPARATUS

The present invention relates to an apparatus for the production of hollow articles from plastics materials such as bottles and especially pressure-proof bottles suitable for carbonated drinks, in which an injection mould can be connected to an injection device for injecting the plastics material into the mould, and having a mandrel which can be introduced into the injection mould leaving an annular injection area, the injection mould and the mandrel each being fixed to their own carrier and these carriers being moved towards each other to introduce the mandrel into the injection mould. The hollow preform injection moulded in this way is subsequently blow moulded in a special blow mould to form the finished bottle, if necessary after being subjected to heat treatment. The injection moulding of the hollow body and blow moulding to form the finished bottle are generally carried out in one and the same apparatus which is fitted with appropriate work stations.

For the subsequent blow moulding of the hollow preform to a finished bottle it is of very considerable importance that the wall thickness of the hollow preform should be completely uniform at any given cross-section along its length. This is, however, frequently not the case in practice as the mandrel and the mandrel carrier attached to it can move under the effect of their own weight from the desired position, as also can the injection mould and the carrier by which it is supported, in such a way that the axes of the mandrel and injection mould are not exactly aligned with each other. Since the free ends of the mandrel and the injection mould are directed towards each other even a very slight shift of the axis of either of the two parts from the desired position will mean that during the subsequent injection moulding of the hollow preform there is a considerable deviation from wall thickness uniformity in wall areas diametrically opposite each other. Such nonuniformity of wall thickness means that, in the subsequent heat treatment, the temperature regulation of the hollow preform varies in the circumferential direction of the preform, something which, together with the insufficient compound, leads to the hollow preform bursting when it is being blow moulded to the final bottle.

According to the present invention there is provided an injection moulding apparatus comprising an injection mould and a mandrel insertable within the mould to define therebetween an annular injection area to form a hollow preform, the injection mould and mandrel each being supported on carriers relatively moveable in the direction of the longitudinal axes of the mandrel and mould, a frustoconical surface formed on the mandrel adjacent the carrier and a co-operating frustoconical surface on the injection mould co-operating with the conical surface of the mandrel when the mandrel is inserted into the mould, a sliding connection between one of the conical surfaces and the respective carrier allowing movement of the conical surface in all directions at right angles to its longitudinal axis, a releasable locking device for locking the sliding connection between said conical surface and said carrier and a locking control mechanism adapted to actuate the locking device dependent on the relative positions of the carriers in the direction of the longitudinal axes of the mandrel and mould.

Through this design according to the invention, if the injection mould and the mandrel are not aligned for any reason both parts automatically align in relation to each other as the mandrel and mould come together so that changes occurring while the apparatus is in operation, eg in the mandrel aligning devices, such as may be caused by varying degress of expansion in the mandrel or mould carriers through heating and cooling, do not have any adverse effect on the hollow preform which is injection moulded. This evens out in particular the undesirable parallel misalignment of the axes of the mandrel and mould and also the slight angular deviations which can occur in many machines.

According to another aspect of the present invention there is provided an injection moulding apparatus comprising an injection mould supported on a carrier and a mandrel insertable within the mould to define therebetween an annular injection area to form a hollow preform, a male frustoconical surface on the base of the mould and a female frustoconical surface on the injection mould adapted to engage with the conical surface of the mandrel, a sliding connection between the mould and the mandrel carrier allowing the mould to move in all directions at right angles to the axes of the conical surfaces, a releasable locking device for locking the sliding connection between the mould and the carrier and a locking control mechanism adapted to actuate the locking device dependent upon the extent by which the mandrel is inserted in the mould.

The incorporation of the sliding connection between the injection mould and its carrier facilitates the incorporation of a locking device and locking control mechanism which can be located around the outside of the mould. This can be done without adding unduly to the space required between the respective carriers and hence keeps the overall size of the machine to a minimum.

It is particularly advantageous to provide locking devices comprising a hydraulic or pneumatic piston. This type of device can be fixed without difficulty to the injection mould carrier and in most cases it can be added at a later stage.

It will be understood that the locking device must be released before the conical surfaces can effect proper alignment of the axes of the mandrel and mould. There is however a risk that if the locking device has been released before the mandrel is inserted into the mould the mould can shift to a position in which the mandrel will come into contact with the mould as it is inserted with resulting damage to the apparatus. Thus the locking control mechanism preferably releases the locking device immediately before the frustoconical surfaces contact one another as the mandrel is inserted into the mould and locks the locking device when the conical surfaces are fully engaged. Releasing the locking device in this way ensures that the injection mould is not released from its carrier until the conical surface on the mandrel has already entered relatively deeply into the conical surface of the injection mould so that when the locking device is released any movement of the injection mould is arrested by contact, albeit on one side only, of the conical surfaces. This contact means that any further movement which may otherwise damage the apparatus is prevented.

In order to retain the axis of the injection mould parallel when the locking device is released with the axis of the mould when the locking device is locked there can be included resilient means adapted to maintain the surfaces of the sliding connection in contact with one another when the locking device is released. Not only does this ensure that when released the mould can only move at right angles to its longitudinal axis, but also ensures that the surfaces of the sliding connection are constantly in contact and cannot become dirty. This resilient means is conveniently adjustable so that the pressure exerted by the resilient means between the sliding surfaces can be adjusted with regard to the weight of the injection mould whilst still allowing sliding movement as required to allow the conical surfaces to properly engage and align the axes of the mandrel and mould.

To provide proper tilt stability between the conical surfaces the Height of the frustum of a cone forming the female conical surface is greater than $$\frac{D}{\text{co-tangent}\alpha - \text{tangent}\alpha}$$

where D is the smallest diameter of the conical surface and $\alpha$ is the angle of inclination of the conical surface from the longitudinal axis. When the length of the female conical surface is so fixed it is ensured that even when the angle $\alpha$ is such that the conical surfaces are non-sticking there is tilt stability between the two surfaces and hence between the mandrel and mould. This ensures that any asymmetrical injection forces or the like cannot tilt the mandrel relative to the mould and the axial alignment is maintained.

Co-operating stop surfaces can be provided on the mandrel and injection mould, a gap existing between the stop surfaces when the conical surfaces are fully in contact, further movement of the mandrel into the mould effecting expansion of the female conical surface to close said gap and fully engage the mandrel with the mould. Such an arrangement means that the centring of the injection mould with the mandrel so that the axes are aligned, which is already achieved during insertion of the mandrel into injection mould, is retained during continued relative movement of the mandrel into the injection mould to close the clearance by expanding the female conical surface and thereby brace the two conical surfaces together in a practically unreleasable manner for the duration of the injection moulding operation. This bracing of the conical surfaces is derived from the pressure applied between the two carriers to close the injection mould and is not released until the closing force applied to the carriers is removed, which of course does not take place until the injection moulding operation is completed.

More than one injection mould can be mounted on the mould carrier, the mandrel carrier being adapted to be indexed to each of the injection moulds in turn to form a single preform in more than one injection moulding step. Injecting the preform in more than one step enables a single preform to comprise a number of layers of different materials. Because of the precise aligning of the mandrel with each of the injection moulds such preforms can be produced consistently and accurately.

Conveniently the mandrels can extend axially parallel with the axis of rotation of the mandrel carrier and in opposite directions therefrom, two mould carriers each carrying moulds simultaneously to and from the mandrels. In this way the output from a single mandrel carrier can be double. Moreover the stability of the mounting of the mandrel carrier is improved and the working life of the carrier bearing is increased since the forces acting on the carrier, such as the mould closing forces described above, are equal on both sides of the carrier.

An embodiment of the present invention will now be more particularly described with reference to the accompanying diagrammatic drawings in which FIG. 1 is one form of an apparatus which can be equipped according to the present invention;

FIG. 3 is a longitudinal section through an injection mould with a mandrel introduced into it;

Figure 1:
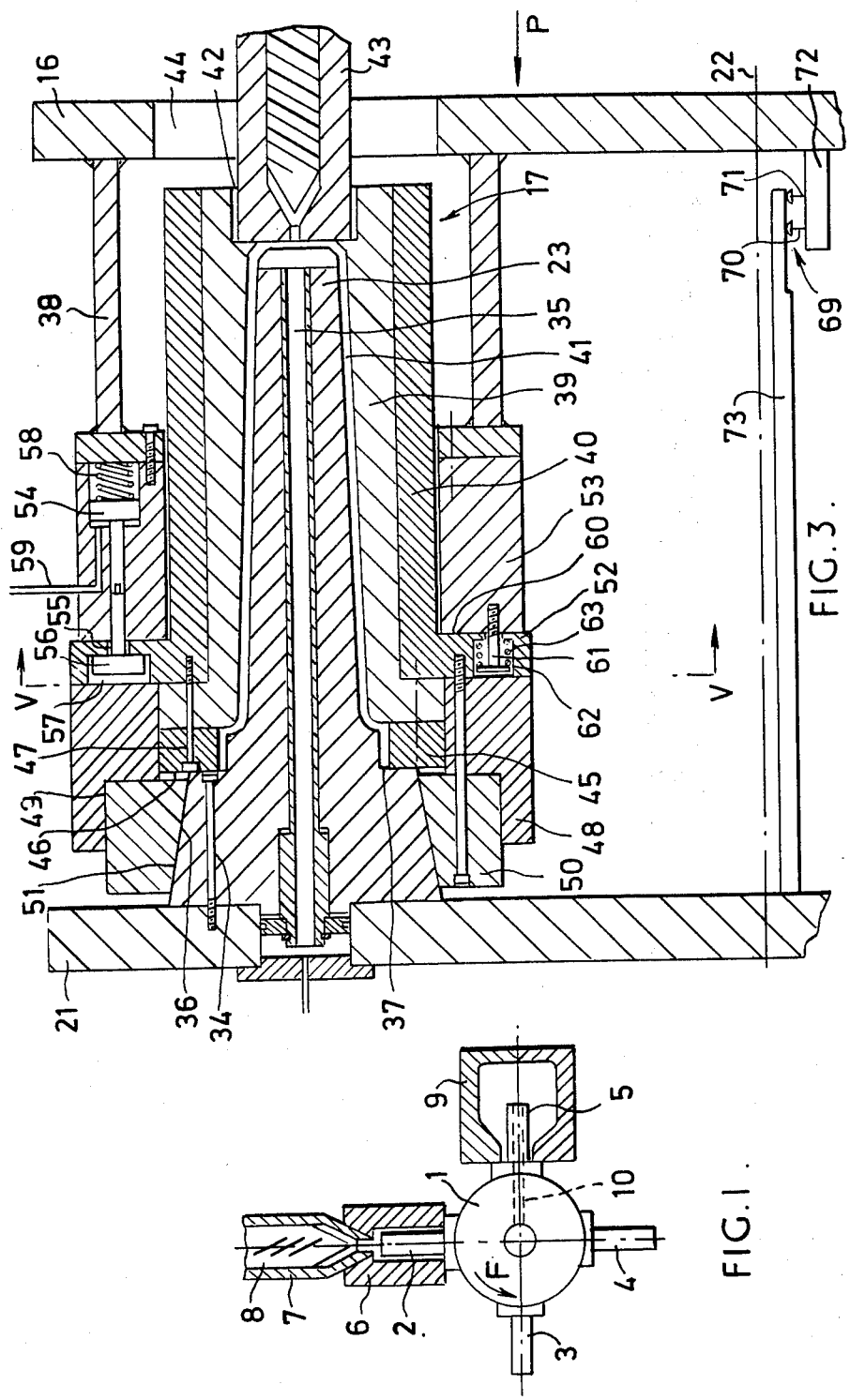

Referring now to FIG. 1 there is shown a turret type carrier 1 which carries four mandrels 2, 3, 4 and 5 extending radially from the carrier. The carrier is adapted to be indexed in the direction of arrow F.

As shown in FIG. 1 the mandrel 2 is at an injection moulding station, the mandrel 2 being surrounded by an injection mould 6 which is shown in engagement with the nozzle of an injection moulding device 7 having a feed screw 8 which forces the plasticised material into the mould.

The mandrel 5 is at the blow moulding station where it is enclosed in a blow mould 9 having an internal shape corresponding to the desired shape of the finished article.

In operation the mandrel carrier is indexed to bring each mandrel in turn successively to the injection moulding station where a preform is moulded and subsequently to the blow mould where the preform is blown to the final desired shape. The blow mould 9 can be in two halves so that it can be split to allow the mandrel to be indexed round with the carrier. At the blow mould station air can be passed though passages 10 in the turret 1 and through the mandrels to expand the preforms, the passage of air through these passages being controlled by a suitable valve mechanism.

Figure 2:
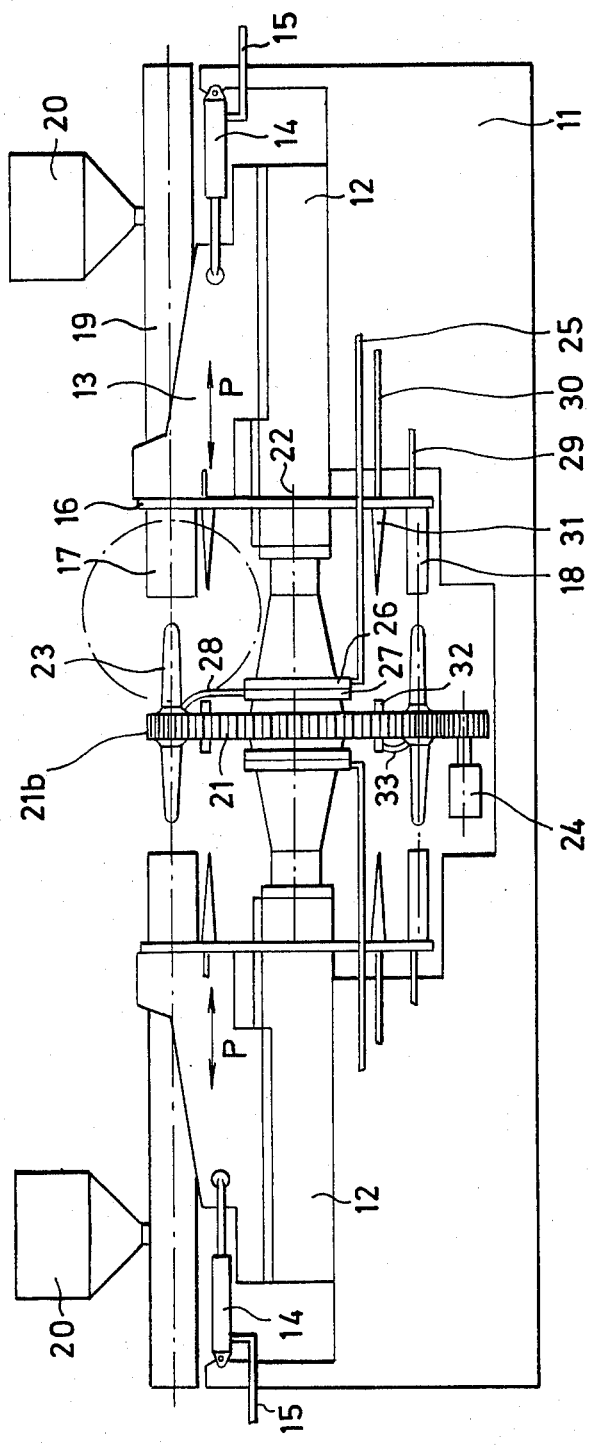
FIG. 2 is another form of apparatus which can be equipped according to the present invention.

Referring now to FIG. 2 there is shown an alternative apparatus which can be equipped according to the present invention. The apparatus comprises a bed 11 which is substantially U shaped as seen in FIG. 2 and has fixed guideways 12 on both the right and left hand parts. Each of the guideways 12 carry a movable member 13 movable back and forth on the guideways in the direction of arrow P by a hydraulic cylinder 14 fed by a hydraulic line 15. Mounted on the movable members are mould carrier plates 16 which each carry at least one injection mould 17, intermediate mould 18 and blow mould (not shown). For each injection mould 17 there is an associated injection device 19 comprising a conventional plasticising and injection unit having a feed funnel 20.

In the valley of the U-shaped bed between the guideways 12 a rotatable mandrel wheel 21 is mounted to rotate about its axis 22. The mandrel wheel 21 carries a number of mandrels 23 which extend parallel to the axis of rotation 22 of the wheel and in opposite directions therefrom. As shown in FIG. 2 the mandrels 23 are not enclosed by the moulds mounted on the carrier plate 16 in which position the mandrel can be indexed round to bring the mandrels into position for the next step of an operating cycle. The mandrel is indexed round by an indexing motor 24 having a driving shaft drivably engaging with a toothed periphery 21b of the mandrel wheel 21.

Provision is made for feeding in a medium to regulate the temperatures of the mandrels 23, the medium being fed by a hose line 25 to a fixed member 26 of a distributor, the distributor having a second member 27 which is mounted to rotate with the mandrel wheel. The medium passes from the second member 27 of the distributor via a hose line 28 to each of the mandrels.

A temperature regulating medium for the intermediate moulds is fed by a hose line 29 to the back of the mould carrier and through passages in the plate to the intermediate moulds.

Provision is also made for the return flow of the temperature regulating mediums in a similar manner.

A further hose line 30 is connected to the back of the mould carrier to convey air to the mandrels 23 for the expansion of the preforms. The hose line 30 connects with nozzles 31 mounted on the mould carrier and which engage with valves 32 when the moulds are brought into position around the mandrels. From the valves 32 air passes through further hose lines 33, or through passage ways in the mandrel wheel, to the mandrels.

In operation the movable members 12 are simultaneously moved from the position shown in FIG. 2 towards the mandrel carrier wheel 21 so that the moulds surround the mandrels. Preforms are moulded on the mandrels in the injection moulds and the movable members moved back to the position shown in FIG. 2. The mandrel wheel 21 is then indexed round to bring the next mandrels to the injection moulding station. The movable members again move the moulds to surround the mandrels and further preforms are moulded in the injection moulds. At the same time the previously formed preforms are subjected to temperature adjustment in the intermediate moulds 18. The moulds are again removed from their positions surrounding the mandrels and the mandrel wheel 21 indexed yet again to produce further preforms. When a mandrel carrying a preform arrives at the blow moulding station the temperature adjusted preforms the blow moulded to the final desired shape in the blow mould.

Referring now to FIG. 3 there is shown on an enlarged scale a cross-section through an injection mould in which a mandrel is inserted. The mandrel 23 is mounted at its base by screws 34 to the mandrel carrier 21 and has a central passage 35 through which blowing air can pass as is well known in the art when the mandrel is indexed to the blow moulding station. The periphery of the base of the mandrel is formed as a male frustoconical surface 36 and the annular surface 37 of the smallest end of the conical base forms a stop surface on the mandrel.

The mould carrier 16 is provided with a cylindrical supporting member 38 for the injection mould indicated generally by the reference No. 17. The injection mould comprises two concentric generally cylindrical members 39 and 40, the inner walls of the inner member 39 co-operating with the mandrel to form an injection area 41. The inner member 39 is provided at the end adjacent the mould carrier with a counterbore 42 in which the injection nozzle 43 enters to inject material into the mould. The counterbore 42 is large enough to permit entry of the nozzle when the mould is displaced by the sliding connection between the mould and mould carrier as hereinafter described and a suitable aperture 44 is also provided in the mould carrier for the injection nozzle.

A cylindrical stop ring 45 is provided at the upper end of the concentric member 39 having a stop surface 46, screws 47 securing the stop ring and the concentric members together. An outer ring 48 has a recess 49 in which is carried a cone member 50 have a female frustoconical surface 51 which co-operates with the male frustoconical surface 36 on the base of the mandrel. The cone member 50 and outer ring 48 are secured by screws to a flange 52 on the outer concentric member 40.

Figure 5:
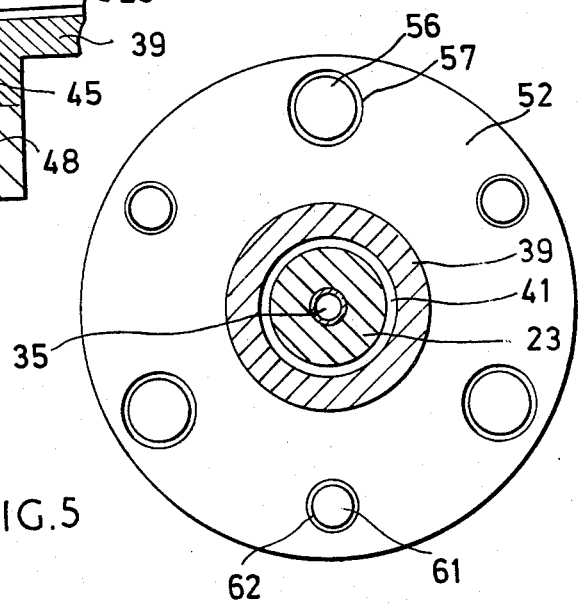
FIG. 5 is a sectional elevation along the line V—V of FIG. 3.

The mould is connected by the flange 52 to the cylindrical supporting member 38 of the carrier by a sliding connection as follows. Secured to the cylindrical supporting member 38 is a connecting ring 53 which is bored as shown at the top of FIG. 3, and in three positions as indicated in FIG. 5, to receive a piston member 54 having a piston rod which passes through a clearance hole 55 in the flange 52 of the outer concentric member, the piston rod having a head 56 in a large counterbore 57 of the clearance hole 55. On one side of the piston 54 there is a spring 58 urging the piston in a direction to move the head 56 out of the counterbore 57 and a passage 59 in the connecting ring 53 is adapted to pass air or liquid under pressure to the other side of the piston towards the piston in the opposite direction.

The abutting surfaces 60 of the flange and supporting ring form the sliding surfaces of the connection and are locked together when the piston is actuated to bring the head of the piston towards the mould carrier and clamp the flange 52 and connecting ring 53 together.

A resilient connection is also provided between the flange 52 and connecting ring 53 by a screw 61 screwed into the connecting ring and having its head located in a counterbore 62 in the flange. A spring 63 between the head of the screw and the bottom of the counterbore maintains the sliding surfaces in contact even when the locking device is released. The tension in the spring can be adjusted by turning the screw thereby enabling the pressure between the sliding surfaces to be adjusted according to the weight of the injection mould whilst still allowing the sliding movement between the mould and the carrier. As will be seen from FIG. 5 three of these resilient connections are provided equally spaced between the pistons.

Figure 4:
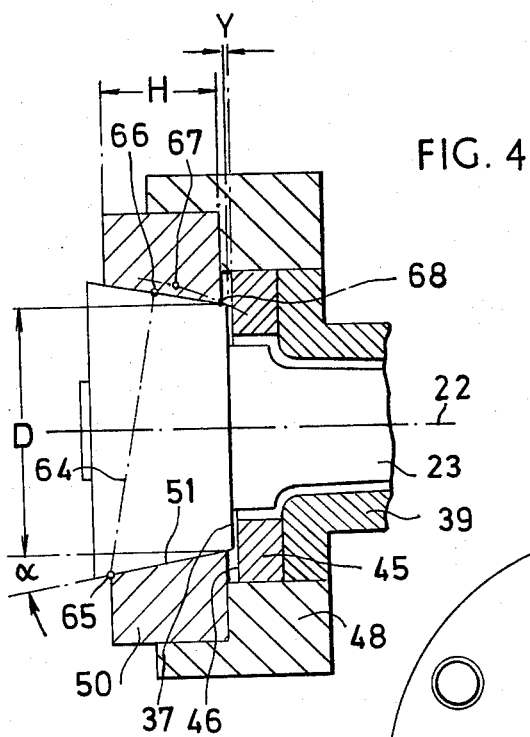
FIG. 4 is a view similar to that of FIG. 3 showing only the centring cone area of an injection mould and mandrel.

As shown in FIG. 3 the conical surfaces are fully engaged. FIG. 4 shows the mould and mandrel just before they are fully engaged. In FIG. 4 the conical surfaces are fully in contact but under no particular pressure, a gap Y existing between the two stop surfaces 37 and 46. Further pressure exerted between the two carriers to close the injection mould causes the cone member 50 having the female conical surface 51 to expand and allow the gap Y to be closed. This braces the conical surfaces together so that the pressure of the material being injected into the mould does not disturb the alignment of the axes of the mould and mandrel. The closing pressure is maintained during injection and hence the bracing is maintained.

As shown in FIG. 4 the height H of the frustum of a cone forming the female conical surface is greater than $$\frac{D}{\text{co-tangent}\alpha - \text{tangent}\alpha}$$

where D is the smallest diameter of the cone and α is the angle of inclination of the conical surface from the longitudinal axis. This design ensures that the female conical member cannot be tilted relative to the male conical surface. As can be seen in FIG. 4 a line 64 drawn from a point 65 at the end of the conical member 50 perpendicular to the opposite conical surface meets the opposite conical surface at a point 66 where the surfaces are in contact. If round the point 65 we draw an arc 67 the radius of which corresponds to the distance between the point 65 and the point 68 we can see that this arc 67 penetrates the body of the conical member 50, while the foot of the perpendicular line 64 rests on the bearing surface line at point 66 which is why any tilting movement of the two conical surfaces 36 and 51 is prevented.

The limiting case for prevention of tilt is when $$H = \frac{D}{\text{co-tangent}\alpha - \text{tangent}\alpha}$$

in which case points 66 and 68 would coincide and the preventing of tilting would just fail.

Referring again to FIG. 3 there is shown just below the axis 22 of the carriers a locking control mechanism comprising a multiple switch 69 having two contacts 70 and 71 attached to the mould carrier by a contact support 72. The switch is operated by a rod 73 carried by the mandrel carrier so that the switch contacts are actuated dependent upon the extent by which the mandrel is inserted in the mould. The switching is arranged so that a first contact is made to release the locking mechanism when the conical surfaces are sufficiently close together that damage cannot occur should the mould move any distance on the sliding connection. Thus as the mandrel is inserted in the mould the sliding connection of the mold allows the mold axis to be aligned with the mandrel axis by the conical surfaces. Either when the conical surfaces are fully in contact or fully engaged a second contact is made and the locking device is actuated to lock the mandrel to the carrier.

When the mould closing pressure is released the locking device remains locked and is not released until a mandrel is again inserted into the mould.

The releasing and actuation of the locking device is effected by the locking control mechanism switch controlling the flow of air or liquid to the piston 54 in a well-known manner.

Figure 6:
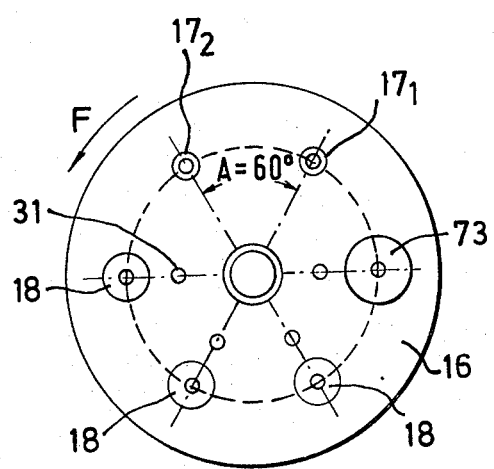
FIG. 6 is an end view of a mould carrier plate having two injection moulds.

Referring now to FIG. 6 there is shown a mould carrier plate 16 which is intended for use when the preform is made of two layers of different materials. For this purpose two injection moulds $17_1$ and $17_2$ are provided but there is only one blow mould 73. This mould carrier plate 16 serves to take the preform produced by insertion of a mandrel into the first injection mould $17_1$, after the appropriate indexing of the mandrel wheel 21, into the second injection mould $17_2$ in which a second layer of material is injected onto the first layer of material injected onto the mandrel 23 in the injection mould $17_1$. This preform, which is therefore built up in two layers, passes in the course of a further processing through three temperature regulating moulds 18 connected downstream of one another and finally reaches the blow mould 73 where it is blow moulded to the finished hollow article.

The order in which the individual mandrel 23 passes through the moulds 17, 18 and 73 of the mould carrier plates 16 of FIG. 6 is shown by the arrow F which also indicates the appropriate direction in connection with FIG. 1. Moreover the angle A indicated in FIG. 6 shows the angle by which the mandrel wheel has to be indexed after each individual working cycle with the use of the carrier plate 16 in question.

A valve nozzle 31 connected to each temperature regulation mould 18 and each blow mould 73 is illustrated, this valve nozzle, according to the description in connection with FIG. 2, serving to feed air for the blow moulding, irrespective of whether this air is for the blow moulding of the preform to the shape of the finished article in the blow mould or for blowing the preform to expand the preform into contact with the inner walls of a temperature regulation mould at a regulating station.

What is claimed is:

1. An injection moulding apparatus comprising an injection mould supported on a carrier and a mandrel supported on a carrier and insertable within the mould to define therebetween an annular injection area to form a hollow preform, a frustoconical surface on the base of the mandrel and a frustoconical surface on the injection mould adapted to engage with the conical surface of the mandrel, a sliding connection between one of the frustoconical surfaces and the respective carrier allowing the frustoconical surface to move in all directions at right angles to the axes of the conical surfaces, a releasable locking device for locking the sliding connection between the frustoconical surface and the carrier and a locking control mechanism adapted to release the locking device immediately before the frustoconical surfaces contact one another as the mandrel is inserted into the mould and lock the locking device when the conical surfaces are fully engaged.

2. An injection moulding apparatus comprising an injection mould supported on a carrier and a mandrel insertable within the mould to define therebetween an annular injection area to form a hollow preform, a male frustoconical surface on the base of the mandrel and a female frustoconical surface on the injection mould adapted to engage with the conical surface of the mandrel, a sliding connection between the mould and the mould carrier allowing the mould to move in all directions at right angles to the axes of the conical surfaces, a releasable locking device for locking the sliding connection between the mould and the carrier and a locking control mechanism adapted to release the locking device immediately before the frustoconical surfaces contact one another as the mandrel is inserted into the mould and lock the locking device when the conical surfaces are fully engaged.

3. Apparatus according to claim 2 in which the height H of the frustum of a cone forming the female frustoconical surface is greater than $$\frac{D}{\text{co-tangent}\alpha - \text{tangent}\alpha}$$

where D is the smallest diameter of the conical surface and α is the angle of inclination of the conical surface from the longitudinal axis.

4. Apparatus according to claim 2 including cooperating stop surfaces on the mandrel and injection mould, a gap existing between the stop surfaces when the conical surfaces are fully in contact, further movement of the mandrel into the mould effecting expansion of the female conical surface to close the said gap and fully engage the mandrel with the mould.

* * * * *